(12) United States Patent
Schateikis et al.

(10) Patent No.: US 7,490,711 B2
(45) Date of Patent: Feb. 17, 2009

(54) METHOD FOR TRANSFERRING A FIRST NUMBER OF OBJECTS AND A SECOND NUMBER OF OBJECTS AND CORRESPONDING DEVICE

(75) Inventors: Dieter Schateikis, Stolberg (DE); Markus Bohn, Stuttgart (DE)

(73) Assignees: Gruenenthal GmbH, Aachen (DE); Harro Hoefliger Verpackungsmaschinen GmbH, Allmersbach (DE)

( * ) Notice: Subject to any disclaimer, the term of this patent is extended or adjusted under 35 U.S.C. 154(b) by 0 days.

(21) Appl. No.: 11/868,241

(22) Filed: Oct. 5, 2007

(65) Prior Publication Data

US 2008/0087524 A1 Apr. 17, 2008

Related U.S. Application Data

(63) Continuation of application No. PCT/EP2006/061313, filed on Apr. 4, 2006.

(30) Foreign Application Priority Data

Apr. 7, 2005 (DE) ........................ 10 2005 016 168

(51) Int. Cl.
  *B65G 47/26* (2006.01)
(52) U.S. Cl. ..................... 198/431; 198/430; 198/471.1
(58) Field of Classification Search ............... 198/347.1, 198/426, 430, 431, 470.1, 471.1, 478.1
  See application file for complete search history.

(56) References Cited

U.S. PATENT DOCUMENTS

| | | | |
|---|---|---|---|
| 3,885,678 | A | 5/1975 | Borg et al. |
| 4,500,247 | A | 2/1985 | McKnight et al. |
| 5,415,295 | A | 5/1995 | Bernardin et al. |
| 5,829,222 | A | 11/1998 | Schlagel et al. |
| 5,855,104 | A | 1/1999 | Schlagel et al. |
| 6,213,283 | B1 * | 4/2001 | Bailey et al. ............ 198/471.1 |

(Continued)

FOREIGN PATENT DOCUMENTS

DE    2 350 296    5/1974

(Continued)

OTHER PUBLICATIONS

German Office Action dated Dec. 15, 2005 (Four (4) pages).

(Continued)

*Primary Examiner*—James R Bidwell
(74) *Attorney, Agent, or Firm*—Crowell & Moring LLP

(57) ABSTRACT

A method for accepting a first number $m_1$ of objects, more particularly pharmaceutical products, from a supplying device and for transferring a second number $m_2$ of objects to a receiving device, and also a device for carrying out such a method, where prior to the transferal of the second number $m_2$ of objects the objects are allowed to accumulate or are stored in a maximum amount equal to from one to ten times the second number $m_2$ and preferably in a maximum amount equal to from three to five times the second number m, and accepting, in-process monitoring, temporary storage, and transfer of objects are carried out within a specified radius about a pivot axis, which radius does not exceed from one to fifteen times the greatest width of the objects and preferably does not exceed from four to six times the greatest width of the objects.

20 Claims, 5 Drawing Sheets

U.S. PATENT DOCUMENTS

| | | | |
|---|---|---|---|
| 6,223,884 B1 * | 5/2001 | Ronchi | 198/431 |
| 6,257,079 B1 | 7/2001 | Mueller | |
| 2004/0001750 A1 | 1/2004 | Kremerman | |

FOREIGN PATENT DOCUMENTS

DE  197 33 436 C2  2/1999

OTHER PUBLICATIONS

International Search Report dated Jul. 5, 2007 including PCT/ISA/220 and PCT/ISA/237 with English translation of relevant portion (Twelve (12) pages).

English translation of International Preliminary Report on Patentability Forms, PCT/IB/338, PCT/IB/373 and PCT/ISA/237 (six (6) pages).

* cited by examiner

METHOD FOR TRANSFERRING A FIRST NUMBER OF OBJECTS AND A SECOND NUMBER OF OBJECTS AND CORRESPONDING DEVICE

CROSS REFERENCE TO RELATED APPLICATIONS

This application is a continuation of International Patent Application No. PCT/EP2006/061313, filed Apr. 4, 2006, designating the United States of America, and published in German as WO 2006/106106 A1, the entire disclosure of which is incorporated herein by reference. Priority is claimed based on German Patent Application No. 10 2005 016 168.5 filed Apr. 7, 2005.

FIELD OF THE INVENTION

The invention relates to a method for the acceptance of a first number $m_1$ of objects, more particularly pharmaceutical products, from a supplying device and for the transferal of a second number $m_2$ of objects to a receiving device.

BACKGROUND OF THE INVENTION

In manufacturing processes it is generally necessary to accept individual products continuously or in groups, as manufactured by a first workstation, and then deliver them either continuously or in groups to a second workstation. These methods disclosed in the prior art frequently require expensive devices or elaborate measures to ensure that the flow of products from the first processing station to the second processing station functions smoothly. This depends particularly on the spatial arrangement of the different processing stations and also on the chronological sequence in the production line. This is important, particularly when different processing measures, for example the shaping of products, the treatment of products, the packaging of products, and the like are carried out on different machines, which vary in terms of their processing capacities, quality rates, rejection rates, and maintenance intervals.

The general goal is to achieve the smoothest possible flow of products throughout the production line spanning from the processing of the products in the preliminary stages of production to packaging or cartoning of the products to make them ready for dispatch, such that the entire production flow is carried out in the most space-saving and economical manner possible. This is because an oversized and thus unused processing capacity at a processing station, for example, is usually reflected by unnecessarily high investment costs, since ultimately the total production capacity is only as great as that of the weakest link in the overall production chain.

The disadvantage of methods disclosed in the prior art for accepting one number of products and transferring a different number of products is that such methods usually require a great deal of space, particularly when it is intended to store or temporarily hold objects or products and also perform quality monitoring in the form of, say, in-process monitoring.

SUMMARY OF THE INVENTION

One object of the invention is to overcome the disadvantages of the methods disclosed in the prior art and to provide the most economical procedure for accepting and transferring objects in a stable manner throughout the operation.

This object is achieved, according to the invention, by means of a method for the acceptance of a first number $m_1$ of objects, more particularly pharmaceutical products, from a supplying device, and for the transferal of a second number $m_2$ of objects to a receiving device, in-process monitoring being performed in the interval between the time of acceptance of the first number $m_1$ of objects and the time of transferal of the second number $m_2$ of objects, and prior to the time of transferal of the second number $m_2$ of objects, the latter are allowed to accumulate or are temporarily stored in a maximum amount equal to between one and ten times the second number $m_2$, preferably in a maximum amount equal to between three and five times the second number m2, whilst the acceptance, the in-process monitoring, the temporary accumulation storage, and the transferal of objects are performed within a predefined radius about a pivot axis, which radius does not exceed from one to fifteen times the maximum width of the objects, and preferably does not exceed from four to six times the maximum width of said objects. It is thus possible, according to the invention, to accept and transfer objects from one processing station to another within the least possible space.

Preferably, the objects are displaced along the pivot axis through a certain path of linear movement and are pivoted about the pivot axis through a path of angular movement, and the first number $m_1$ preferably differs from the second number $m_2$. It is thus possible to displace the objects not only spatially but also in a manner that is particularly adapted to suit the respective workstation, for example, by changing their orientation and position. This makes it possible, according to the invention, to set up the overall arrangement of a production facility when using the method of the invention in an optimal, i.e. space-saving, and economical, manner.

It is further preferred that the acceptance of the first number $m_1$ of objects and the transferal of the second number $m_2$ of objects occur substantially simultaneously. Another preference is that the first number $m_1$ of objects is transferred during an accepting clock pulse, and the second number $m_2$ of objects is transferred during a transferring clock pulse, and the receiving and transferring clock pulses at least partially overlap temporally. It is thus possible, according to the invention, to process or pass objects through the production facility clock pulse-wise, the numbers $m_1$ and $m_2$ being optimally adaptable to the respective requirements of the individual processing stations within relatively wide limits.

According to the invention, the objects are preferably allowed to accumulate or are stored following in-process monitoring. This makes it possible to avoid the storage or temporary accumulation of objects that do not meet the quality criteria, since such objects can be separated prior to the accumulation or storage stage. Furthermore, it is thus possible, according to the invention, to stabilize the production flow of objects, since a sudden higher rejection rate will not disrupt the production line with detrimental consequences. Such negative consequences are only likely to occur after a (comparatively improbable) permanent deterioration of the production quality.

Furthermore, in-process monitoring is preferably performed simultaneously on each object in a group of objects equal to the first number $m_1$ of objects. It is thus advantageously possible to perform the in-process monitoring in the same clock pulse raster as the acceptance of the first number of objects, thereby simplifying and economizing the overall process flow.

It is further preferred that the first number $m_1$ of objects is preferably from five to fifty, particularly sixteen, and the second number $m_2$ of objects is from one to fifteen, particularly five, the first number $m_1$ of objects being preferably greater than the second number $m_2$. It is thus possible, according to the invention, to achieve standard capacity ratios of production plants, or of individual workstations of such production plants, particularly for pharmaceutical products, when using the method of the invention.

Another object of the present invention is a device for the acceptance of a first number $m_1$ of objects, more particularly pharmaceutical products, from a supplying device and the transferal of a second number $m_2$ of objects to a receiving device for carrying out the method of the invention, the device comprising a transferring device, a monitoring device, and a temporary storage device. It is thus possible to carry out the method of the invention in a particularly simple and efficient way using such a device of the invention.

The transferring device preferably comprises a post coincident with the pivot axis and a first transferring receptacle radially spaced from the pivot axis and a second transferring receptacle radially spaced from the pivot axis. It is thus possible to achieve a change in the location or position of the objects within a very small space in an easy and simple manner and with a particularly high level of positional accuracy.

It is further preferred that the transferring receptacle be axially spaced along the post by approximately half the length of the path of linear movement to be covered by the objects from the first location to the third location. It is thus possible to displace the objects in half clock pulses in such a way that the objects are accepted and displaced for checking by the monitoring device in a first half clock pulse, and the objects are transferred from in-process monitoring to the temporary storage device in a second half clock pulse, which takes place at the same time (for other objects) as the first half clock pulse.

Furthermore, the pivot axis of the device of the invention preferably extends substantially vertically, i.e. in the method of the invention the pivot axis extends substantially vertically. The objects can then be rotated easily and also, if appropriate, about their own axis (vertical axis) and thus supplied to the subsequent workstations or removed from the preceding workstations in optimal manner.

The temporary storage device preferably comprises a funnel as a storage unit or accumulation unit. It is thus possible to store and temporarily hold the objects in a reliable and stable manner incurring very little elaboration.

BRIEF DESCRIPTION OF THE DRAWINGS

The invention will be explained in more detail below with reference to the exemplary embodiments shown in the drawings, in which.

DETAILED DESCRIPTION

Figure 1:
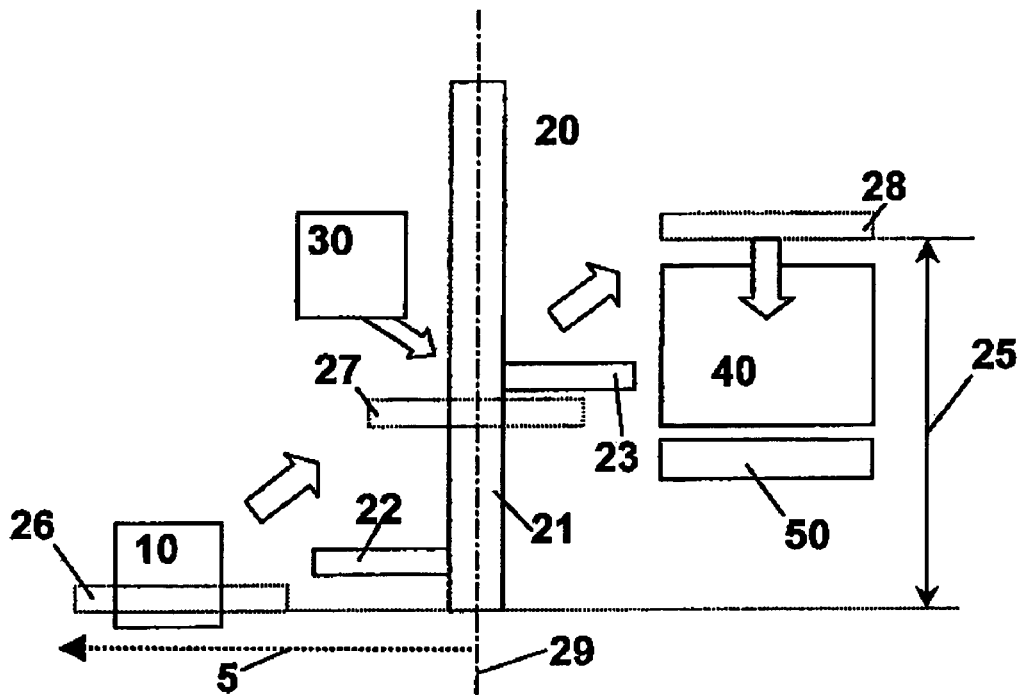
FIG. 1 is a side view of an exemplary embodiment of the device of the invention, and demonstrates the method of the invention.

FIG. 1 is a side view of a diagrammatic representation of the device of the invention. At a first location marked with the reference numeral 26, a supplying device 10 (not pertaining to the device of the invention) delivers objects (not shown in FIG. 1) for acceptance by the device of the invention. A transferring device 20 forming part of the device of the invention accepts the objects, particularly by means of a first transferring receptacle 22, and transports them to a second location 27, where the objects are checked by a monitoring device 30. At the same time as the transportation of the objects from the first location 26 to the second location 27, other objects, more particularly another group of objects, are transported from the second location 27 to a third location 28 by means of a second transferring receptacle 23 provided on the transferring device 20.

The objects are therefore displaced from the first location 26 to the third location 28 in two half steps, the transferring device 20 performing the first and second half steps, preferably simultaneously, with an identical movement in such a way that the first transferring receptacle 22 always performs the first half step, and the second transferring receptacle 23 always performs the second half step. The first and second half steps are each indicated in FIG. 1 by the arrow pointing from bottom left to top right between the first location 26 and the second location 27 and between the second location 27 and the third location 28. On arriving at the third location 28, the objects pass through a temporary storage device 40, according to the invention. This passage of the objects is illustrated by the arrow pointing vertically downwardly. The temporary storage device 40 transfers the objects for supplying a receiving device 50 (not pertaining to the device of the invention). According to the invention, the objects 2 pass through a path of linear movement 25 along the pivot axis 29 between the first location 26 and the third location 28, and at the same time pass through a path of angular movement about the pivot axis 29. For this purpose, according to the invention, the transferring device 20 preferably comprises a post 21, which coincides, in particular, with the pivot axis 29 and on which the first and the second transferring receptacles 22, 23 are radially spaced from said post. FIG. 1 further shows a radius 5 about the pivot axis 29, indicated by a dashed arrow, which radius indicates the radius of movement in the method or device of the invention. According to the invention, the method is contrived such that it can be performed in a particularly space-saving manner and the device of the invention is designed such that it requires very little space.

Figure 2:
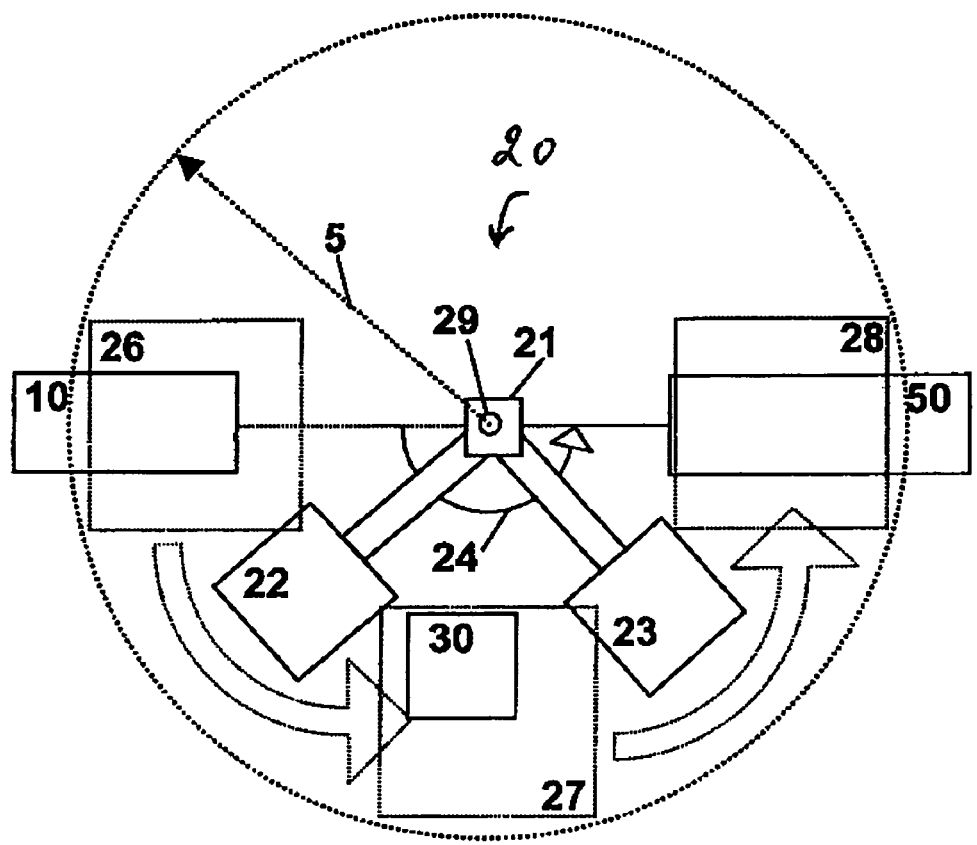
FIG. 2 is a top view of a diagrammatic representation of a device of the invention.

FIG. 2 is a top view of a diagrammatic representation of the device of the invention for demonstrating the method of the invention. FIG. 2 again shows the radius 5 extending from the pivot axis 29. Furthermore, a dotted circle is shown at the head of the arrow indicating the radius 5, which circle indicates the operating range of the device of the invention or the maximum space required for performing the method of the invention. The first location 26, the second location 27, and the third location 28 are again indicated, by dotted lines, and the supplying device 10 (not pertaining to the device of the invention) that moves the objects (likewise not shown in FIG. 2) to the first location 26 for acceptance by the transferring device 20. The supplying device 10 therefore serves as a transfer interface between the device of the invention and any workstation disposed upstream of the latter in the production line. Furthermore, FIG. 2 shows the third location 28 and the receiving device 50 (not pertaining to the device of the invention) for receiving the objects (not shown in FIG. 2) from the device of the invention. The transferring device 20 further comprises a post 21 coinciding with the pivot axis 29, on which post the first transferring receptacle 22 and the second transferring receptacle 23 are disposed radially spaced from the pivot axis 29. As can be seen from FIG. 1, the transferring receptacles 22, 23 are disposed on the post 21 axially spaced from each other by approximately half the length of the path of linear movement 25 to be covered between the first location 26 and the third location 28 along the pivot axis 29. As regards the angular movement of the transferring device 20 about the pivot axis 29, the first transferring receptacle 22 in the example shown in FIG. 2 moves only within the angular region between the first location 26 and the second location 27, while the second transferring receptacle 23 in the example shown in FIG. 2 moves only between the second location 27 and the third location 28. The total angular movement of the objects from the first location 26 to the third location 28 (during two consecutive clock pulses of the transferring device 20), is performed through an (overall) path of angular movement indicated by the reference numeral 24. The intermediate storage of the objects at the second location 27 makes it possible to perform in-process monitoring, according to the invention, by means of the monitoring device 30, particularly at the second location 27. In-process monitoring using the monitoring device 30 is indicated in FIG. 1 by the arrow on the monitoring device 30, pointing obliquely from top left to bottom right. The movement between the first location 26 and the second location 27 (first partial movement of the objects or the first half step) is shown in FIG. 2 by means of a dotted 900 arrow between the first location 26 and the second location 27, and the second partial movement of the objects between the second location 27 and the third location 28 is shown in FIG. 2 by another dotted 900 arrow. In the region of the third location 28, the objects are transferred, according to the invention, to the receiving device 50, the objects being moved from the third location 28 through the temporary storage device 40, mainly due to the action of the force of gravity, i.e. substantially downwardly.

Figure 3:
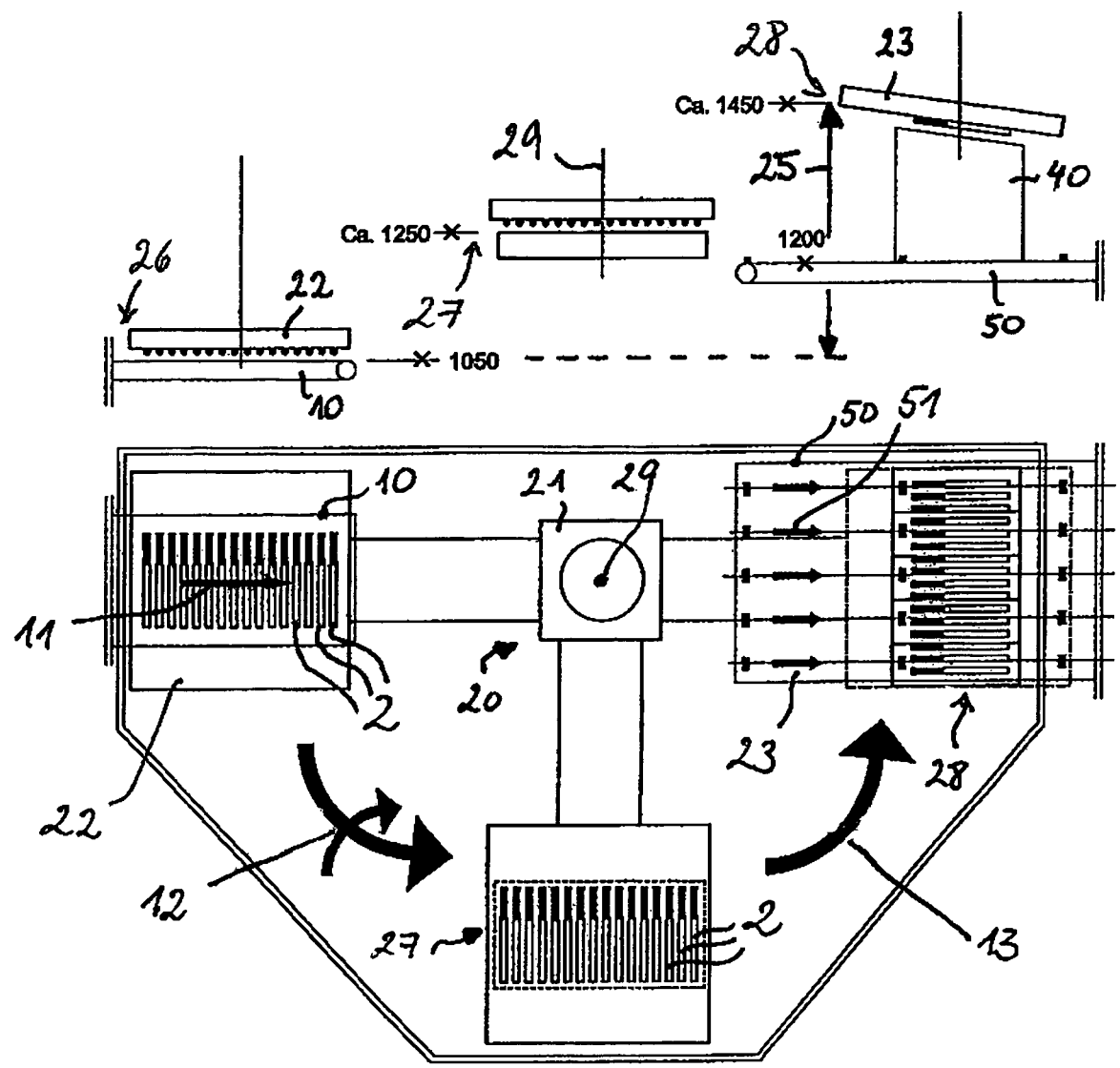
FIG. 3 is a detailed view of the device of the invention with, in particular, a detailed representation of the transferring device.
Figure 4:
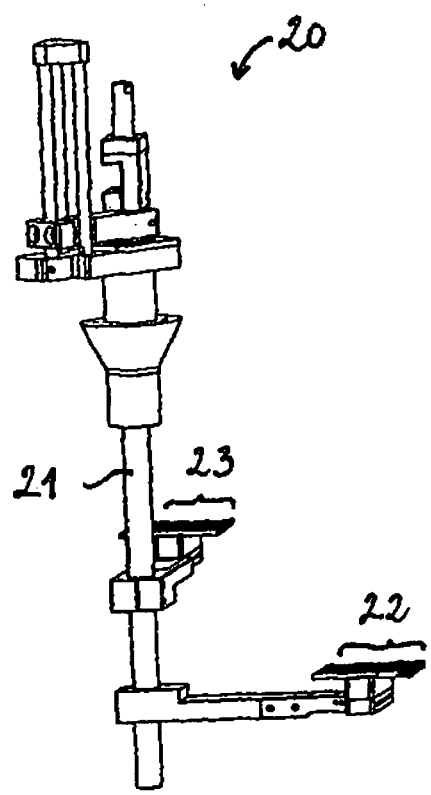
FIGS. 4 to 7 are different views of the transferring device.
Figure 5:
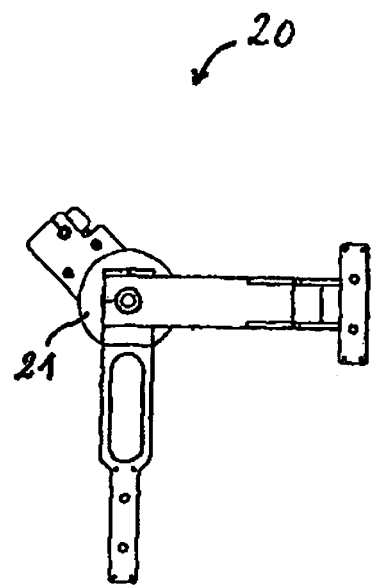
Figure 6:
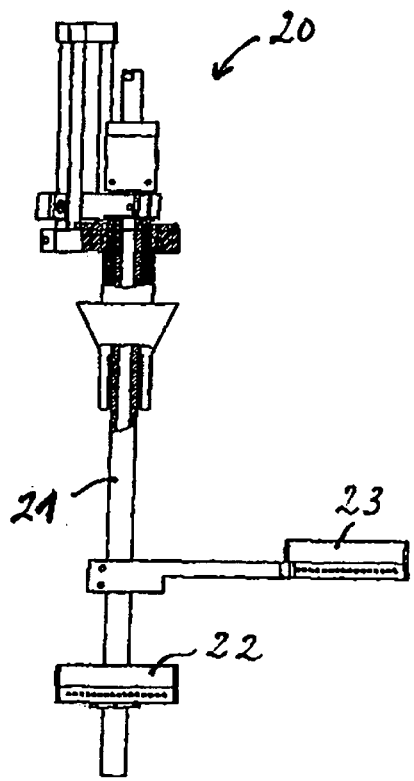
Figure 7:
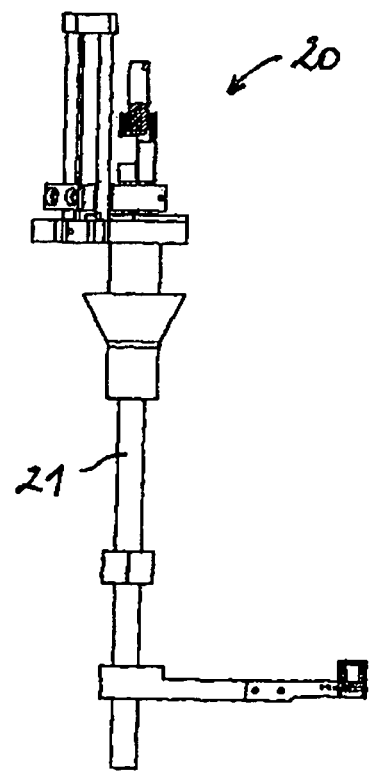
Figure 10:
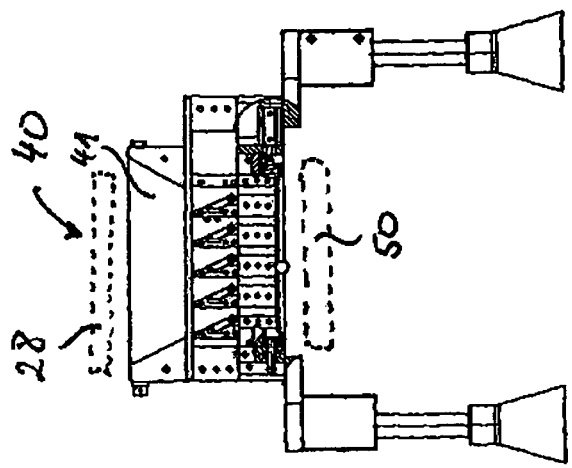
FIGS. 8 to 11 are different views of the temporary storage device.
Figure 9:
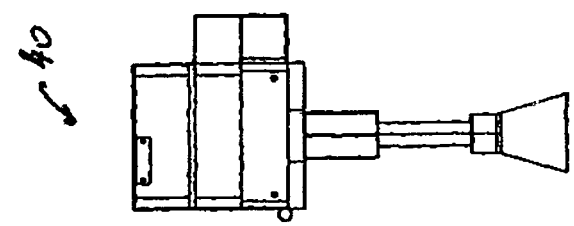
Figure 8:
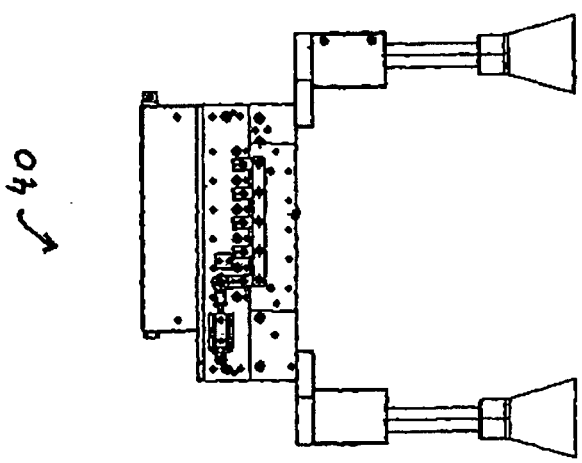
Figure 11:
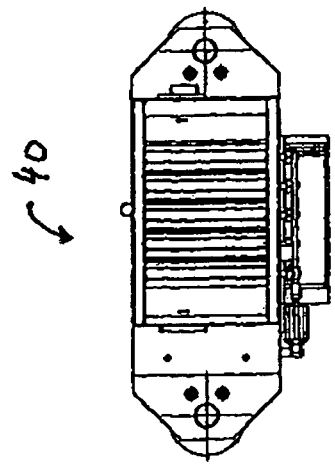

FIG. 3 is a detailed representation of the device of the invention for demonstrating the method of the invention. The supplying device 10, in the form of, say, an (endless) conveyor belt, transports objects 2 to the first location 26, which is not marked as such in FIG. 3. Here, a group of objects 2 equal in number to a first number $m_1$ is accepted by the transferring device 20, more particularly by means of the first transferring receptacle 22, and is transferred to the second location 27, the transferring device 20 pivoting about the pivot axis 29. As the transferring device 20 pivots, the first transferring receptacle 22 moves (longitudinally), according to the invention, along the pivot axis 29, as do the objects 2 transported by means of the transferring receptacle 22. The transferring device 20, more particularly its first transferring receptacle 22, then deposits the objects 2 at the second location 27, and moves back in such a way that the first transferring receptacle 22 arrives at the first location. When the first transferring receptacle 22 has returned to the first location, the second transferring receptacle 23 is at the second location 27 and ready to receive the objects 2. The second transferring receptacle 23 moves the objects 2 it has received at the second location 27 to the third location 28 by performing the same movement (as that performed during the aforementioned first clock pulse of the device), with which the first transferring receptacle 22 moves the group of $m_1$ objects from the first location 26 to the second location 27. At the third location 28, the temporary storage device 40 is disposed below the target position of the second transferring receptacle 23, so that the objects 2 can be transferred by the transferring device 20, or more particularly the second transferring receptacle 23, to the temporary storage device 40. Finally, the temporary storage device 40 delivers a second number $m_2$ of objects to the receiving device 50 during a transferring clock pulse. As shown in FIG. 3, in the present example, the first number $m_1$ is equal to a group of sixteen objects 2 and the second number $m_2$ is equal to a group of five objects to be delivered by the temporary storage device 40 to the receiving device 50. Naturally, the first number $m_1$ and the second number $m_2$ can be selected so as to differ from those mentioned above. The direction of transport of the supplying device 10 is indicated by an arrow 11 in FIG. 3, and the direction of transport of the receiving device 50 is indicated by an arrow 51 in FIG. 3. Both arrows 11, 51 point from left to right and are substantially parallel to each other. This means that the device of the invention or the method of the invention enables objects 2 to be transferred clock pulse-wise from the workstation (not shown) which delivers the objects via the supplying device 10 to the workstation (not shown) which receives the objects via the receiving device 50, during which process the objects undergo a change in orientation (the objects 2 are accepted lying transversely to the direction of transport 11 and are delivered longitudinally aligned in the direction of removal 51, also in a lying position). As a result, the method of the invention and the device of the invention can be contrived in a particularly economical and space-saving manner. The objects 2 are shown individually in FIG. 3. They have an oblong shape and are, particularly as pharmaceutical products, for example, in the form of drinking straws for administering single doses. The objects 2 are provided with a light and a dark end in FIG. 3 in order to clearly show their orientation in the course of the procedure proposed by the invention. The angular movement about the pivot axis 29 during said procedure is indicated by the arrows marked with reference numerals 12 and 13.

The arrows marked with the reference numeral 12 in FIG. 3 indicate that the objects 2 are either not rotated about the pivot axis 29 between the first location 26 and the second location 27 or are rotated first toward the left by the angular movement of the transferring receptacle 22 about the pivot axis 29 by 90°, and then by approximately 90° toward the right at the second location 27, for example, on a turntable, so that the orientation of the objects 2 remains constant. Alternatively to such twofold rotation of the objects in different directions, it is possible, according to the invention, to adapt the transferring receptacles 22, 23 such that they can rotate about a different axis parallel to the pivot axis 29 on their respective arms disposed on the post 21. The arrow 13 indicates that the objects 2 are pivoted through approximately 90° to the left between the second location 27 and the third location 28 so that, in all, the objects 2 are pivoted about the pivot axis 29 through approximately 90° to the left between the first location 26 and the third location 28.

Furthermore, the upper part of FIG. 3 clearly shows that the transferring device passes through a path of linear movement 25 between the first location 26 and the third location 28, the second location 27 being disposed on the pivot axis 29 at a point approximately half-way along said path 25 (see the side view of the detailed view of the device of the invention shown in the upper part of FIG. 3).

FIGS. 4 to 7 show different views of the transferring device 20 with the post 21, and of the first and second transferring receptacles 22, 23.

Figure 12:
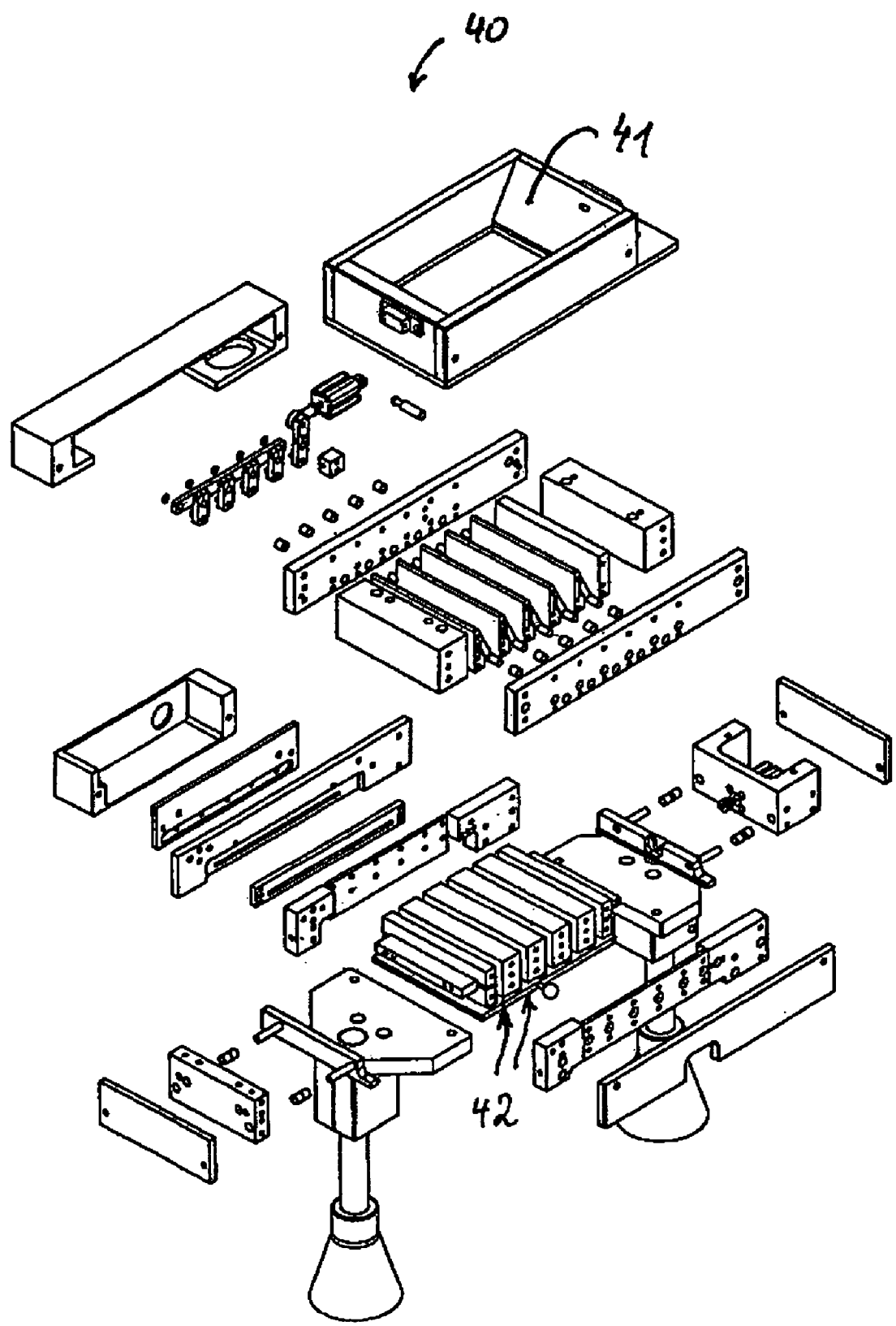
FIG. 12 is an exploded view of the temporary storage device.

FIGS. 8 to 11 show different views of the storage device 40 with the funnel 41, and FIG. 12 is an exploded view of the storage device 40. A dotted line in FIG. 10 indicates the spatial relationship of the storage device 40 and the third location 28. The objects 2 (not shown in FIG. 10) fall from the third location 28 into the funnel 41 of the storage device 40 and are then delivered in groups to the receiving device 50, likewise indicated by dashed lines, the number of objects 2 in such a delivery group being equal to the second number $m_2$. A particular advantage of the invention is that the storage device 40 comprises shutter openings, which can be opened and closed by sliding the shutters and can simultaneously deliver a number of objects 2 equal to the second number $m_2$. The shutter openings are shown in the exploded view of FIG. 12 at the point marked with reference numeral 42.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A method for handling objects, said method comprising the steps of
    accepting a first number $m_1$ of objects from a supplying device;
    transferring a second number $m_2$ of objects to a receiving device;
    monitoring during the interval between the step of accepting the first number $m_1$ of objects and the step of transferring the second number $m_2$ of objects, and
    prior to transferring the second number $m_2$ of objects, accumulating the objects to a maximum amount equal to from one to ten times the second number $m_2$,
    wherein the accepting, the monitoring, the accumulating, and the transferring of objects are performed within a specified radius about a pivot axis, which radius does not exceed from one to fifteen times the greatest width of the objects,
    whereas the acceptance of the first number $m_2$ of objects is performed in a first half step and the transferal of the second number $m_2$ is performed in a second half step,
    whereas the first half step is always performed by a first transferring receptacle and the second half step is always performed by a second transferring receptacle, and
    whereas the first and the second transferring receptacles are pivoted about the pivot axis.

2. The method according to claim 1, wherein said objects are pharmaceutical products.

3. The method according to claim 1, wherein said objects are allowed to accumulate in a maximum amount equal to from three to five times the second number $m_2$.

4. The method according to claim 1, wherein said radius does not exceed from four to six times the greatest width of the objects.

5. The method according to claim 1, comprising
    moving said objects along said pivot axis in a path of linear travel,
    pivoting said objects about said pivot axis through an angle of angular travel and
    wherein said first number $m_1$ differs from said second number $m_2$.

6. The method according to claim 1, wherein said first number $m_1$ of objects are accepted substantially simultaneously and said second number $m_2$ of objects are transferred substantially simultaneously.

7. The method according to claim 1, wherein said first number $m_1$ of objects are transferred during an acceptance clock pulse and said second number $m_2$ of objects are transferred during a transferal clock pulse, and said acceptance clock pulse and said transferal clock pulse at least partially overlap temporally.

8. The method according to claim 1, further comprising accumulating or storing said objects following said monitoring.

9. The method according to claim 1, wherein said monitoring is performed simultaneously on each object in a group of objects and the number of objects in said group of objects is equal to said first number $m_1$ of objects.

10. The method according to claim 1, wherein said first number $m_1$ of objects ranges from five to fifty, and said second number $m_2$ of objects ranges from one to fifteen.

11. The method according to claim 1, wherein said first number $m_1$ of objects is sixteen.

12. The method according to claim 1, wherein said second number $m_2$ of objects is five.

13. The method according to claim 1, wherein the first number $m_1$ of objects is larger than the second number $m_2$.

14. A device for accepting a first number $m_1$ of objects from a supplying device and for transferring a second number $m_2$ of objects to a receiving device in accordance with a method involving the following steps of
    accepting a first number $m_1$ of objects from a supplying device;
    transferring a second number $m_2$ of objects to a receiving device;
    monitoring during the interval between the step of accepting the first number $m_1$ of objects and the step of transferring the second number $m_2$ of objects, and
    prior to transferring the second number $m_2$ of objects, accumulating the objects to a maximum amount equal to from one to ten times the second number $m_2$,
    wherein the accepting, the monitoring, the accumulating, and the transferring of objects are performed within a specified radius about a pivot axis, which radius does not exceed from one to fifteen times the greatest width of the objects,
    whereas the acceptance of the first number $m_2$ of objects is performed in a first half step and the transferal of the second number $m_2$ is performed in a second half step,
    whereas the first half step is always performed by a first transferring receptacle and the second half step is always performed by a second transferring receptacle, and
    whereas the first and the second transferring receptacles are pivoted about the pivot axis,
    said device comprising:
    a transferring device, a monitoring device, and a buffering device.

15. The device according to claim 14, wherein said objects are pharmaceutical products.

16. The device according to claim 15, wherein said transferring device has a post coincident with the pivot axis and also a first transferring receptacle radically spaced from said pivot axis and a second transferring receptacle radically spaced from said pivot axis.

17. The device according to claim 15, wherein said transferring receptacles are axially spaced from each other along said post by a distance equal to approximately half of a path of linear travel.

18. The device according to claim 15, wherein said pivot axis extends substantially vertically.

19. The device according to claim 15, wherein said buffering device comprises a funnel for storing or buffering.

20. The device according to claim 15, wherein said buffering device comprises a funnel as storing or buffering means.

* * * * *